Nov. 6, 1923.

L. M. WOOLSON 1,473,136

HYDROCARBON MOTOR

Filed July 11, 1921

INVENTOR
Lionel M. Woolson.
BY
ATTORNEY.

Patented Nov. 6, 1923.

1,473,130

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed July 11, 1921. Serial No. 483,995.

*To all whom it may concern:*

Be it known that I, LIONEL M. WOOLSON, a citizen of the United States, and resident of Detroit, Wayne County, State of Michigan, have invented certain new and useful Improvements in Hydrocarbon Motors, of which the following is a specification.

This invention relates to hydrocarbon motors and particularly to means for heating the mixture passing to the motor.

In hydrocarbon motors, particularly as used on motor vehicles, it is very desirable that the motor should start quickly and reach its maximum power very quickly even in cold weather and various means have been devised for heating the mixture supplied to the motor in order that this condition may be fulfilled. One of such heating devices is a combustion heater which is supplied with mixture, which mixture is burned and delivered into the motor intake conduit. While such devices are sufficient for ordinary running they do not produce a maximum heating effect when the motor is cold and it is the theory of this invention that a greater heating effect may be produced by controlling the amount of mixture passing to the combustion heater and connecting that control with the mixture control of the carburetor so that the maximum heating effect may be produced when the carburetor is supplying its richest mixture, and vice versa.

One of the objects of the present invention therefore is to provide a heating means for the mixture of a hydrocarbon motor such that the amount of heat will be increased as the richness of the mixture supplied to the motor is increased.

Another object of the invention is to provide a combustion heater for the mixture of a hydrocarbon motor with controlling means therefor which will increase the supply of mixture to the combustion heater as the richness of the mixture supplied to the motor is increased.

Figure 1:
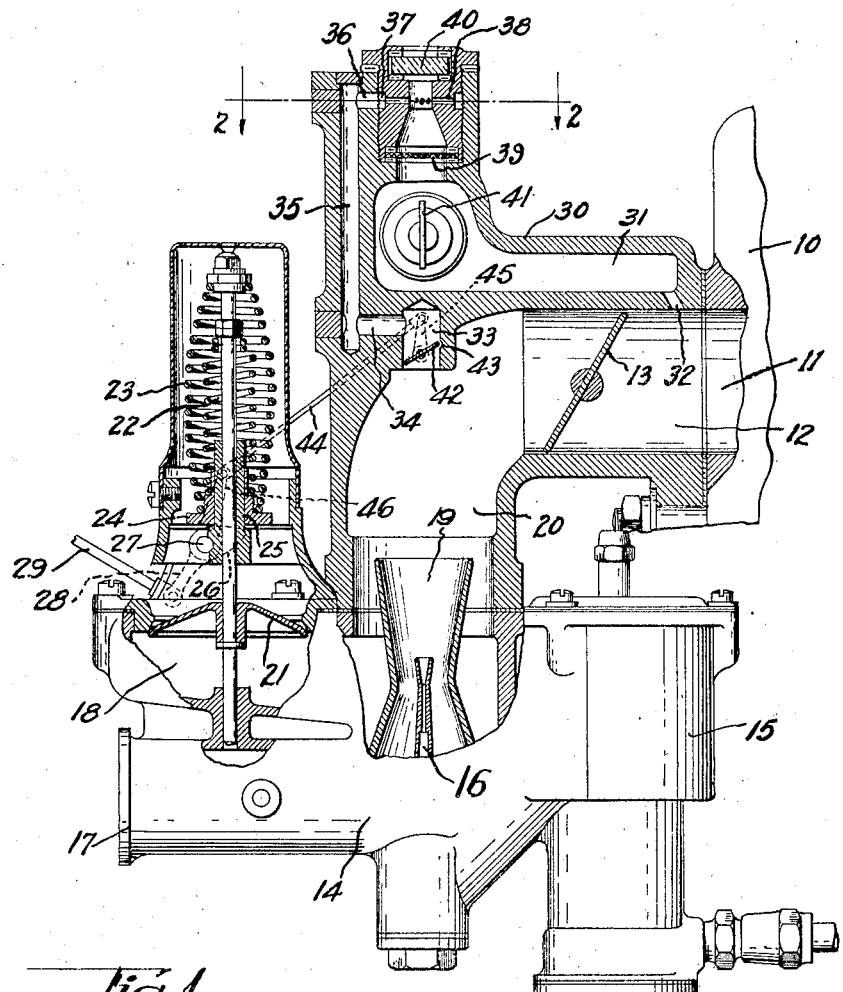
Figure 2:
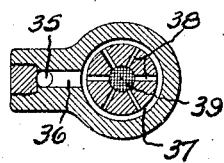

Other objects of the invention will appear from the following description taken in connection with the drawings, which form a part of this specification, and in which:

Fig. 1 is a vertical section, partly in elevation, thru a device embodying the invention; and Fig. 2 is a horizontal section on the line 2—2 of Fig. 1.

Referring to the drawings, 10 represents a hydrocarbon motor and 11 is its intake passage. An intake conduit 12 is connected to the motor and the throttle valve 13 controls the supply of mixture passing to the motor thru the conduit 12.

Means for supplying mixture to the conduit 12 is shown in the form of a carburetor 14 having the usual float chamber 15, the nozzle 16 connected thereto, air intakes 17 and 18, a mixture tube 19 and a mixing chamber 20. The quality or richness of the mixture furnished by the carburetor may be controlled either by increasing and decreasing the amount of liquid fuel relative to the air openings or by varying the air openings, and in the form of the invention illustrated herein the mixture is controlled by varying the tension on the spring means of the air valve of the carburetor. An air valve 21 controls the air intake 18 and this valve is spring-closed by two light springs 22 and 23, which springs are adjustable by a movable abutment 24. The abutment 24 may be moved on its support 25 by a cam 26 pivoted at 27 and an arm 28 and rod 29 permit control of the cam 26 by the operator. It will be understood that by changing the tension on the springs 22 and 23 the air valve 21 may be adjusted to permit more or less air to enter the intake 18 under the suction of the motor. And thus the richness of the mixture is accordingly varied.

For the purpose of heating the mixture as it passes to the motor a combustion heater or combustion heating device 30 is provided and this device is shown in the form of a chamber 31 surrounding a part of the intake conduit 12 and having an outlet 32 communicating with the conduit 12 so that the products of combustion from the heater 30 will be carried into the intake conduit by the suction of the motor.

The combustion heater 30 is, in the present illustrative form of the invention, supplied with mixture from the mixing chamber 20 of the carburetor. A passage marked 33, 34, 35, 36, 37, and 38, forms the means of communication between the mixing chamber 20 and the combustion chamber 31 above referred to. The mixture upon entering the chamber 31 passes thru a screen 39 and a glass window 40 is provided so that the flame in the chamber 31 may be observed. A sparkplug 41 is provided for igniting the mixture in the chamber and any suitable means of connection for the sparkplug to the motor ignition mechanism may be employed.

Control of the amount of mixture passing to the combustion heater is effected in the form shown by a small butterfly valve 42 in the passage 33, a by-pass 43 being provided around the throttle 42 so that sufficient mixture may pass to the combustion heater to operate it to a minimum extent even when the throttle 42 is closed.

Inter-connecting means between the throttle 42 and the means for varying the mixture of the carburetor are provided in the form of a rod 44 connecting an arm 45 on the throttle 42 with an arm 46 on the cam 26. Thus as the cam 26 is moved by the operator the throttle valve 42 will also be moved, said throttle valve opening to supply more mixture to the combustion heater as the tension on the valve springs 22 and 23 is increased. Thus as the carburetor mixture is made richer the combustion heater is supplied with more mixture and consequently the heater will produce a greater heating effect.

Other forms of the device may be made without departing from the spirit or scope of the invention.

Having thus described my invention, what I claim and desire to secure by Letters Patent is:

1. In a hydrocarbon motor, the combination with the mixture conduit thereof, of means for supplying mixture thereto, means for controlling the richness of said mixture, a combustion heating device for heating said mixture, means for supplying mixture to said device, and means for increasing the mixture opening to said combustion heating device in proportion to the richness of the mixture supplied to said conduit.

2. In a hydrocarbon motor, the combination with the mixture conduit thereof, of means for supplying mixture thereto, means for controlling the richness of said mixture, a combustion heating device for heating said mixture, means for supplying mixture to said device, and means for increasing the mixture opening to said combustion heating device as the mixture controlling means is operated to increase the richness of the mixture supplied to said conduit.

3. In a hydrocarbon motor, the combination with the mixture conduit thereof, of means for supplying mixture thereto, means for controlling the richness of said mixture, a combustion heating device for heating said mixture, means for leading some of said mixture to said device, and means for increasing the supply of mixture to said device as the richness of said mixture is increased.

4. In a hydrocarbon motor, the combination with the mixture conduit thereof, of a carburetor connected to said conduit, adjustable mixture varying means for said carburetor, a combustion heater for said mixture, and means controlled by said adjustable means for controlling the supply of mixture to said heater.

5. In a hydrocarbon motor, the combination with the mixture conduit thereof, of means for supplying mixture thereto, means for controlling the richness of said mixture, a combustion heating device for heating said mixture, means for supplying mixture to said device, and means for increasing the supply of mixture to said device in direct relation to the richness of the mixture supplied to said conduit.

In testimony whereof I affix my signature.

LIONEL M. WOOLSON.